June 13, 1967  M. H. STEPHENSON, JR  3,325,739
CONVERTER CIRCUIT MULTIPLYING SLIGHT DIFFERENCE
FREQUENCY BETWEEN AT LEAST TWO FREQUENCY
COMPONENTS OF SINGLE INPUT
Original Filed July 13, 1962

INVENTOR.
MORRIS H. STEPHENSON, JR.

BY Charles J. Ungemach

ATTORNEY

United States Patent Office 3,325,739
Patented June 13, 1967

3,325,739
CONVERTER CIRCUIT MULTIPLYING SLIGHT DIFFERENCE FREQUENCY BETWEEN AT LEAST TWO FREQUENCY COMPONENTS OF SINGLE INPUT
Morris H. Stephenson, Jr., Glendora, Calif., assignor to Honeywell Inc., a corporation of Delaware
Continuation of application Ser. No. 209,518, July 13, 1962. This application Sept. 4, 1964, Ser. No. 396,795
7 Claims. (Cl. 328—16)

This invention pertains to improvements in control apparatus and more particularly to improvements in Doppler augmentation techniques for sonar systems. This is a continuation of my copending application Ser. No. 209,518, filed July 13, 1962, now abandoned, for Control Apparatus.

The Doppler effect is the change in the frequency of a sound or radio wave reaching an observer and is due either to motion of the source toward or away from the observer, the motion of the observer, or both.

Similarly, in sonar systems the change in frequency between the reverberation signal and the target echo is due either to own ships motion, target motion, or both.

If only target Doppler is considered, then when a target is motionless in the water, the frequency of the target echo will be the same as that of reverberations from the surrounding medium. However, if the target is moving away from the echo-ranging vessel, its range is opening, hence, the frequency of the echo will be decreased.

Conversely, if the target is moving toward the echo-ranging vessel, its range will be closing more rapidly than that of the surrounding medium and therefore the frequency of the echo will be raised more than that of the reverberations and would be of a higher frequency.

The Doppler shift is an invaluable aid to the sonar operator in helping him to determine the direction and speed of a target.

Because of the present trend toward low frequency, high power sensors, the difference in frequency between the reverberation signal and the target echo is becoming very hard to detect.

The present invention offers a solution to this problem by providing a means for increasing the difference in frequency between reverberation signals and target signals.

While the present invention works extremely well as a Doppler augmentor, it is not limited to this use. The invention can also be used to separate close frequency communication signals or, for that matter, it can be used in any system where it is desirable to separate or increase the frequency difference between two input signals.

In a broad sense, this invention comprises a frequency multiplier which is operable in response to an input signal. The input signal has at least two frequency components, for example, $F_1$ and $F_2$. If frequency $F_2$ is just slightly different than frequency $F_1$, then $F_2$ can be represented as $F_2 = F_1 \pm \Delta F$. Frequencies $F_1$ and $F_2$ are multiplied by a constant factor N in the multiplier and appear at the multiplier output as $NF_1$ and $NF_1 \pm N\Delta F$. The multiplier output is fed to a mixer and is mixed with a reference signal from an oscillator having a frequency $(N-1)F_1$. The output of the mixer will include the sum and difference frequencies of the input signals. The sum frequencies are:

$$NF_1 + (N-1)F_1 = 2NF_1 - F_1$$

and $$NF_1 \pm N\Delta F + (N-1)F_1 = 2NF_1 \pm N\Delta F - F_1$$

The difference frequencies are:

$$NF_1 - (N-1)F_1 = F_1$$

and $$NF_1 + N\Delta F - (N-1)F_1 = F_1 \pm N\Delta F$$

The output of the mixer is fed through a filter which passes only the difference frequencies so that the output of the filter will be $F_1$ and $F_1 \pm N\Delta F$. Examining the relationship of the output of the filter, it can be readily seen that the frequency difference between the frequency components of the input signal have been increased by a factor of N, the multiplication factor of the multiplier.

It is one object of my invention, therefore, to provide a circuit for increasing the frequency difference between frequency components of an input signal.

It is another object of my invention to provide a circuit for increasing the frequency difference between a reverberation signal and a target Doppler signal in a sonar system.

Figure 1:
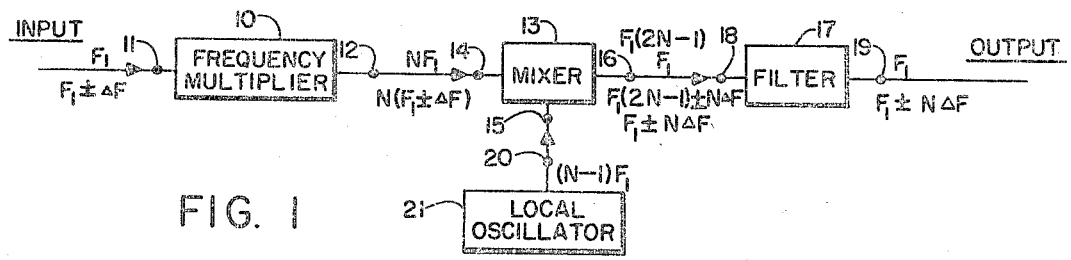
FIGURE 1 shows a block diagram of an embodiment of this invention.

These and other objects of my invention will become apparent to those skilled in the art upon consideration of the accompanying specification, claims, and drawings, of which:

Structure of FIGURE 1

Referring to FIGURE 1, there is shown a frequency multiplier 10 having an input 11 and output 12. Output 12 of frequency multiplier 10 is connected to an input 14 of a mixer 13. Mixer 13 further has an input 15 and an output 16. Output 16 of mixer 13 is connected to an input 18 of a filter 17. Filter 17 further has an output 19. Input 15 of mixer 13 is connected to the output 20 of a local oscillator 21.

Figure 2:
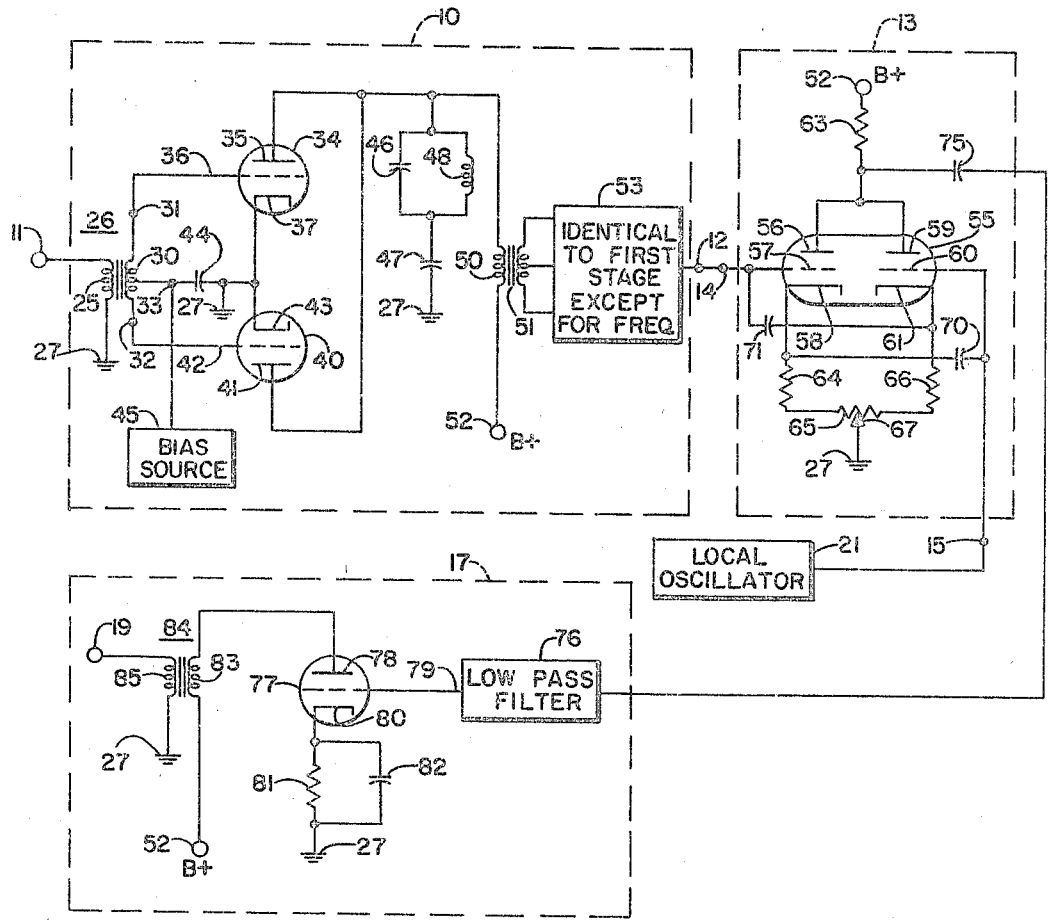
FIGURE 2 shows a schematic representation of the circuit of FIGURE 1.

Structure of FIGURE 2

Referring to FIGURE 2, there is shown the multiplier circuit 10 having input terminal 11. Input terminal 11 is connected through a primary winding 25 of a transformer 26 to ground 27. Transformer 26 further has a secondary winding 30 having an end terminal 31 and end terminal 32 and a center tapped terminal 33.

End terminal 31 of transformer 26 is connected to a grid 36 of a triode 34. Triode 34 has a plate 35 and a cathode 37. End terminal 32 of secondary winding 30 is directly connected to a grid 42 of a triode 40. Triode 40 further has a plate 41 and a cathode 43. Cathode 37 of triode 34 is directly connected to cathode 43 of triode 40 and is further directly connected to ground 27. Plate 35 of triode 34 is directly connected to plate 41 of triode 40. Center tapped terminal 33 of secondary winding 30 is connected to ground 27 by means of the capacitor 44 and is further directly connected to a source of bias potential 45. Plate 35 of triode 34 is further connected by means of a capacitor 46 in series with a capacitor 47 to ground 27. An inductance 48 is connected in parallel with capacitor 46. Plate 35 of triode 34 is further connected by means of a primary winding 50 of a transformer 51 to a source of energizing potential 52. The secondary of transformer 51 is connected to the circuit of box 53. Box 53 contains a second stage of multiplication structurally identical to the first stage just described. The first stage comprises triodes 34 and 40 and their associated circuitry.

The output 12 of multiplier 10 is connected to the input 14 of mixer 13. Input 14 is directly connected to a grid 57 of a dual triode 55. Dual triode 55 further has a plate 56, a cathode 58, a plate 59, a grid 60 and a cathode 61. Plate 56 of dual triode 55 is directly connected to plate 59, and is further connected by means of a resistor 63 to the positive potential source 52. Cathode 58 of dual triode 55 is connected by means of a resistor 64 in series with a potentiometer 65, and a resistor 66 to the cathode 61 of dual triode 55. A wiper 67 of potentiometer 65 is connected directly to ground 27. Cathode 58 is further connected by means of a capacitor 70 to the grid 60 of dual triode 55 while cathode 61 is directly connected by means of a capacitor 71 to grid 57 of dual triode 55. Grid 60 of dual triode 55 is further connected to the output 15 of local oscillator 21.

Common plates 56 and 59 of dual triode 55 are connected by means of a capacitor 75 to the input of a low pass filter network 76. The output of low pass filter network 76 is directly connected to the grid 79 of a triode 77. Triode 77 further has a plate 78 and a cathode 80. Cathode 80 of triode 77 is connected to ground 27 by means of a resistor 81 in parallel with the capacitor 82. Plate 78 of triode 77 is connected by means of a primary winding 83 of a transformer 84 to the positive potential source 52. Transformer 84 further has a secondary winding 85. One terminal of transformer secondary winding 85 is connected to ground 27 and the other terminal of secondary winding 85 is connected to output terminal 19.

*Operation*

The operation of the circuits of FIGURES 1 and 2 is as follows: assume that an input signal having a reverberation signal frequency of 800 cycles per second and a target Doppler frequency of 830 cycles per second is fed to input terminal 11 of multiplier 10 from the sonar receiver. Assume further that the frequency multiplier has a constant multiplying factor of 4. In this case, the output of the frequency multiplier will have frequency components of 3200 cycles per second and 3320 cycles per second. These signals are fed to the input 14 of mixer 13 where they are mixed with the signal from the local oscillator. Since, as explained previously, the local oscillator oscillates at a frequency of $(N-1)F_1$, where N is the multiplication factor of the frequency multiplier and $F_1$ is the frequency of the reverberation signal, the local oscillator will oscillate at a frequency of 2400 cycles per second. The output of mixer 13 will be the sum and difference frequencies of the output of frequency multiplier 10 and the output of local oscillator 21. The sum frequencies will be 5600 cycles per second and 5720 cycles per second, while the difference frequencies will be 800 cycles per second and 920 cycles per second. The output of mixer 13 is fed through the low pass filter network 17 which eliminates the sum frequencies. The output of low pass filter 17 will therefore be the difference frequencies, or in other words, 800 cycles per second and 920 cycles per second. It can readily be seen that the sonar operator no longer must distinguish between frequencies of 800 and 830 cycles per second, but now distinguishes between frequencies of 800 and 920 cycles per second. In other words, the sonar operator's task of distinguishing between reverberations signal and target signal frequency is considerably easier.

Referring to FIGURE 2, the 800 cycle and the 830 cycle signal is fed from input terminal 11 to the primary winding 25 of transformer 26. These signals induce signals in the secondary winding 30 of transformer 26 which are fed to the control grids 30 and 42 of triodes 34 and 40 respectively. Triodes 34 and 40, transformer 26, and their associated circuitry form a "push-push" circuit which provides frequency doubling of the input signal. Therefore, frequencies of 1600 cycles per second and 1660 cycles per second appear in the plate circuit of triodes 34 and 40 and are fed through transformer 51 to the second stage 53. Stage 53 is identical to the first "push-push" stage except for the frequencies involved. The frequency output of the second multiplier stage 53 is the frequency of 3200 cycles and 3320 cycles per second. The output signal frequencies from stage 53 are fed to the grid 57 of dual triode 55. At the same time, the 2400 cycle per second reference frequency from the local oscillator 21 is fed to grid 60 of dual triode 55. The two input signals are mixed in mixer stage 13 and appear at the plates 56 and 59 of dual triode 55 as the sum and difference frequency of the input signals. The difference frequencies are coupled to low pass filter 76 to the grid 79 of triode amplifier 77. These frequencies are amplified in triode amplifier 77 and are coupled through the primary 83 of transformer 84. The signals in the primary 83 of transformer 84 are coupled through to the secondary winding 85 of transformer 84 and appear at the output 19 as a frequency of 800 cycles per second and 920 cycles per second.

It is to be understood that while I have shown a specific embodiment of my invention, that this is for the purpose of illustration only and that my invention is to be limited solely by the scope of the appended claims.

What is claimed is:

1. A Doppler shift augmentor for use in a pulsed detection and ranging system for increasing the frequency difference between a first signal pulse corresponding to transmitted pulse of basic signal frequency F and a reflected signal pulse of frequency $F \pm \Delta F$ where $\Delta F$ corresponds to Doppler shift and the first pulse occurs prior in time to the reflected pulse, comprising:
   multiplying means receiving both the first and reflected signals at an input thereto and operable to multiply the basic frequency F, and the Doppler frequency $F \pm \Delta F$ by a factor N, which is greater than one, to produce two components NF and $N(F \pm \Delta F)$;
   means for mixing the multiplied basic signal frequency NF and the multiplied Doppler frequency $N(F \pm \Delta F)$ with a signal frequency of $(N-1)F$ to produce an output signal having four components F, $2NF - F$, $2NF - F \pm N\Delta F$, and $F \pm N\Delta F$; and
   filter means for passing only the F and $F \pm N\Delta F$ frequency components of said output signal.

2. Apparatus for accentuating differences in frequency between a plurality of signals comprising in combination:
   (a) multiplying means having input and output terminals;
   (b) a plurality of sources of signal, one of said signals being of a frequency F, and at least one of said signals having a different frequency;
   (c) means connecting said sources of signal to the input means of said multiplying means;
   (d) a source of reference signal having a frequency related to the frequency, F, of said one of said sources of signal and to said multiplying means;
   (e) mixing means having input terminals and an output terminal;
   (f) means connecting the output terminal on said multiplying means to an input terminal on said mixing means; and
   (g) means connecting said source of reference signal to an input terminal on said mixing means, whereby the differences in frequency between said one of said sources of signal and the signals from said sources of signal appearing at the output terminal of said mixing means are increased in accordance with the characteristics of said multiplying means.

3. The apparatus of claim 2 in which the multiplying means is operative to multiply each of the signals by a factor N and the source of reference signal is of a frequency $F(N-1)$.

4. The apparatus of claim 3 in which a filter means is connected to the output of the mixing means.

5. The apparatus of claim 4 in which the filter means is operative to block signals having a frequency substantially higher than signal frequency F.

6. The apparatus of claim 5 in which the filter means is operative to block signals having a frequency substantially lower than signal frequency F.

7. The apparatus of claim 2 in which the signals from said plurality of sources are displaced in time.

References Cited

UNITED STATES PATENTS

| 2,423,103 | 7/1947 | Koechlin | 331—38 X |
| 2,920,284 | 1/1960 | Beagles et al. | 331—38 X |

ARTHUR GAUSS, Primary Examiner.

J. HEYMAN, Assistant Examiner.